UNITED STATES PATENT OFFICE.

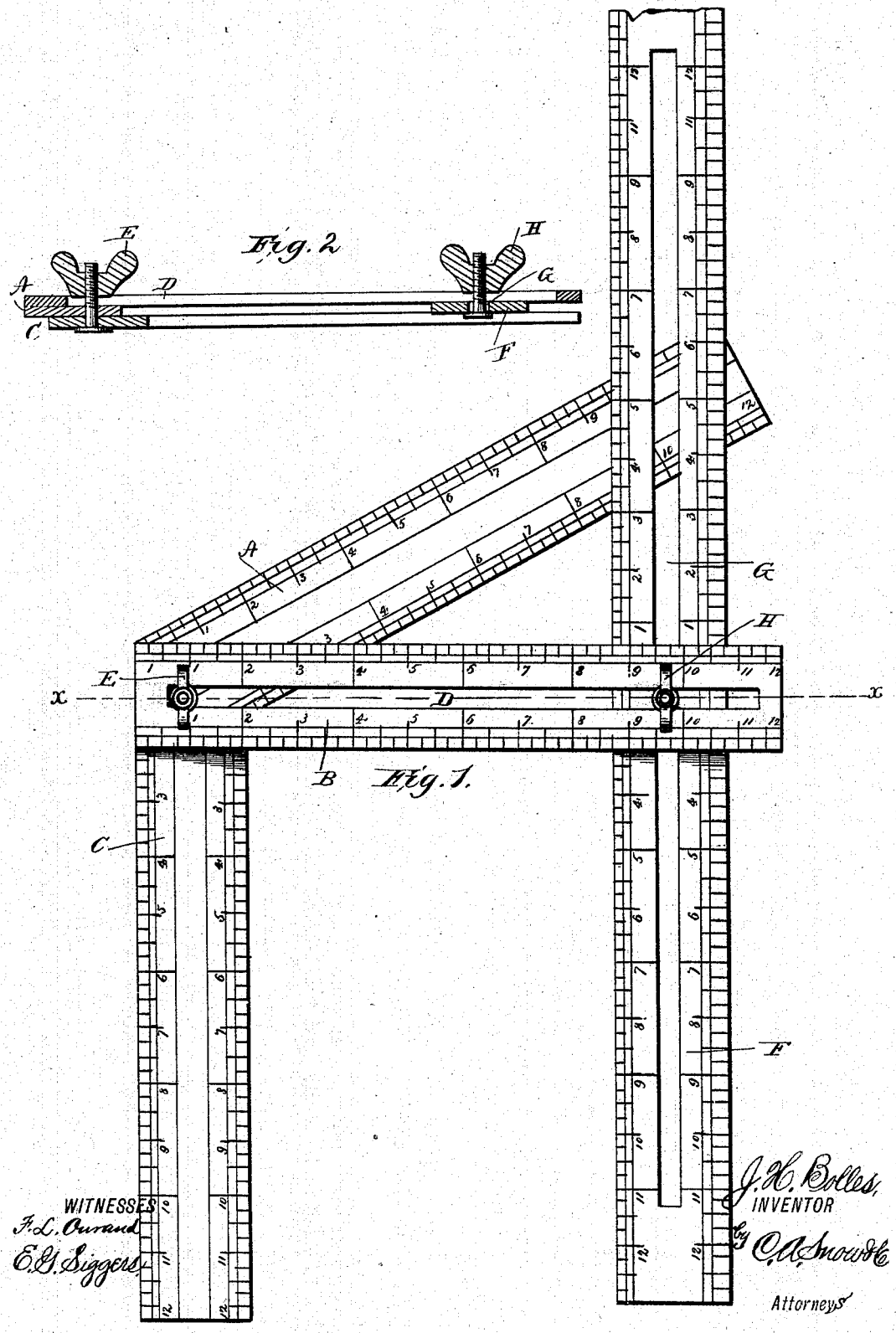

JAMES H. BOLLES, OF DALLAS, TEXAS.

MITER AND FRAMING SQUARE.

SPECIFICATION forming part of Letters Patent No. 288,613, dated November 20, 1883.

Application filed August 6, 1883. (No model.)

*To all whom it may concern:*

Be it known that I, JAMES H. BOLLES, a citizen of the United States, residing at Dallas, in the county of Dallas and State of Texas, have invented a new and useful Miter and Framing Square, of which the following is a specification.

This invention relates to miter and framing squares adapted to be used for framing houses, bridges, tressels, or any other frame-work where angles are required; and it consists in the improved arrangement and construction of graduated scales, whereby I attain superior advantages in point of simplicity, durability, inexpensiveness, and general efficiency.

In the accompanying drawings, Figure 1 is a plan view of my improved miter and framing square; and Fig. 2 is a sectional view on the line $x\,x$, Fig. 1.

Like letters refer to corresponding parts in the several figures.

Referring to the drawings, A B C designate three scales, of equal length, graduated in inches and fractions thereof, the scale B having a longitudinal groove, D, cut through its central portion, the groove terminating about one-half of an inch from each end. A thumb-screw, E, connects the inner ends of scales A C to the middle scale, B, said thumb-screw being adapted to be moved in the groove D, in order to adjust any one or all of said scales to different angles. F is a scale made twice as long as either of the other scales, and provided with a longitudinal groove, G, extending through its central portion to about an inch and a half from each end. A thumb-screw, H, connects the scale F to the other end of scale B, the thumb-screw being adapted to be shifted either through the groove D of scale B or along the groove G, and as it is moved the scales are changed in their relative positions to each other, the inclinations being modified or enlarged according to the movements of the separate scales, and thus the various angles required in carpentry can be readily obtained by the manipulation of the scales, as stated. The thumb-screws hold the scales at any desired position after they have been properly adjusted. When the device is closed, it will form an adjustable gage, which can be used by simply sliding the scale F to any desired position and then setting the thumb-screws firmly. The scales and their adjustable thumb-screws can be made from brass, iron, steel, or any other suitable material, as found desirable. All of the scales are graduated in inches and fractions thereof, so that all necessary measurements can be readily obtained.

The operation and advantages of my improved miter and framing square will be readily understood and appreciated by those skilled in the art to which it appertains. The operation is simple, while the article itself forms a neat and durable article of manufacture.

Having described my invention, what I claim as new is—

As an improvement in miter and framing squares, the scale F, formed with a longitudinal slot, in combination with the three scales A B C, of equal length, pivoted together, the middle scale only having a longitudinal slot, and connected to the scale F by a thumb-screw, said scale F being twice the length of either the three scales, the parts being arranged and connected for joint operation, as and for the purpose set forth.

JAMES H. BOLLES.

Witnesses:
EUGENE S. SEAY,
ELMER E. BLACKBURN.